Sept. 9, 1941.   A. G. HACKETT ET AL   2,255,582
MEANS FOR CONTROLLING UNDESIRED MOVEMENT OF SHAFTS IN VEHICLES OR THE LIKE
Filed July 15, 1939   6 Sheets-Sheet 1

Inventors:
Alfred George Hackett
James Leslie Edwards
by Walter S. Bleston
ATTORNEY

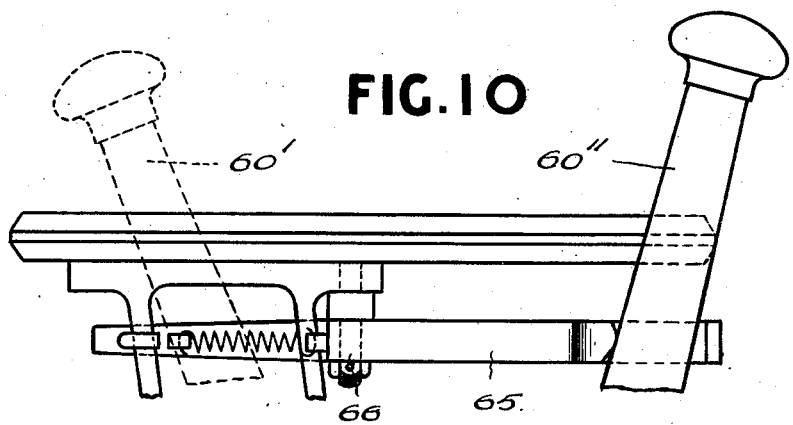
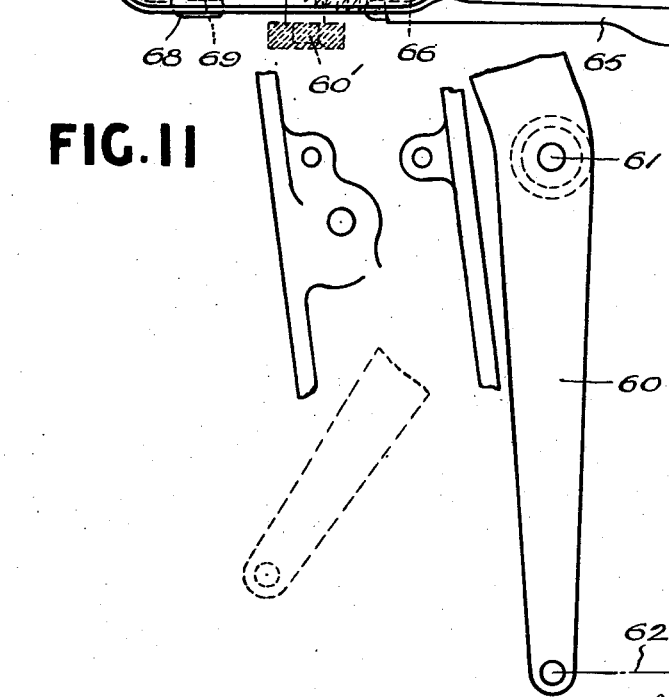

Patented Sept. 9, 1941

2,255,582

UNITED STATES PATENT OFFICE 2,255,582

MEANS FOR CONTROLLING UNDESIRED MOVEMENT OF SHAFTS IN VEHICLES OR THE LIKE

Alfred George Hackett, Harborne, Birmingham, and James Leslie Edwards, Selly Park, Birmingham, England Application July 15, 1939, Serial No. 284,640
In Great Britain July 18, 1938

5 Claims. (Cl. 192—4)

This invention relates to new or improved means for controlling undesired movement of a shaft in a vehicle or the like and while the invention is primarily intended for holding a vehicle against reverse movement when starting on a gradient or when stationary on a gradient it is also applicable to ensuring unidirectional rotation of a shaft in a crane, lift or any other piece of machinery.

According to one feature of our invention there is arranged to co-operate with a toothed or notched disc or the like on a shaft or other rotating member which may be part of the transmission of a motor vehicle one or a number of catch members or detents which have a part-rotational movement in a stationary member surrounding the rotating disc, the catch member or members being adapted in one or each of two positions to lock the disc against rotation in one or in either direction.

The catch members are preferably held normally in an inoperative position by means actuated frictionally by the disc or a part associated therewith when the disc is rotating in its normal direction but are brought into action automatically on any angular movement of the disc in the other direction, and the catch members are preferably also controlled manually and/or, in the case of a vehicle, from the selecting mechanism of the vehicle gear-box to allow the vehicle to be driven backwards when reverse gear is engaged or to allow the vehicle to be moved by hand in a garage.

The form of the engaging surfaces on the catch members or detents and the disc is preferably such that even when the vehicle is being held on a gradient by the catch members they can be disengaged if necessary by operation of a lever or the like to allow the vehicle to move down the gradient in an emergency, as for example if there was a danger of another vehicle colliding with it.

Preferably each detent is a hardened steel member of part-circular form and is partially rotatable in a complementary recess in the inner edge of a stationary plate or ring surrounding a toothed or notched disc keyed on a rotating shaft forming part of the transmission of a vehicle.

In a neutral position the catch member is clear of the toothed disc but partial rotation of the detent causes one end of it to engage with a tooth or notch in the disc to hold the shaft against rotation in one direction. The face of the tooth or notch with which the detent engages is preferably curved to an arc about the effective centre of the detent so that by positive actuation of the detent it can be disengaged even when supporting a load.

The detent or each detent may normally be held in a neutral position by a cam ring or equivalent means lightly coupled frictionally to the toothed disc or a part rotating therewith so that the cam ring tends to be carried round against a stop as the disc rotates and the cam ring can be controlled from the gear-selecting mechanism of the vehicle and/or by a hand lever when it is desired to move the vehicle in reverse or to move it by hand in a garage.

The detent or detents may be actuated from the ring in any convenient manner. For example a lug on the detent may enter a radial notch in the ring, teeth on the ring may mesh with teeth on the detent, or cam surfaces on the ring may co-operate with a part of the detent or of a part carried by it.

Where two, three or more detents are employed they are all actuated simultaneously by the ring and they may be staggered angularly with respect to the notches or teeth on the disc so that the reverse movement permitted before a detent comes into engagement with a notch is less than the angular spacing between the notches.

Alternatively, instead of controlling the detent or detents by a floating ring they may be controlled by hand and only brought into action when there is a risk of the vehicle running backwards, as for example when it is parked on a hill.

When the device is applied to a trailer vehicle the detent or detents may normally be held in a neutral position by means connected to or actuated from the tractor so that if the coupling between the tractor and trailer breaks the detent automatically comes into action under the influence of a spring or other means to prevent the trailer from running backwards.

Some practical forms of our invention have been illustrated by way of example in the accompanying drawings in which:

Figures 10 and 11 are a diagrammatic side elevation and plan respectively of an alternative form of control.

Figure 1:
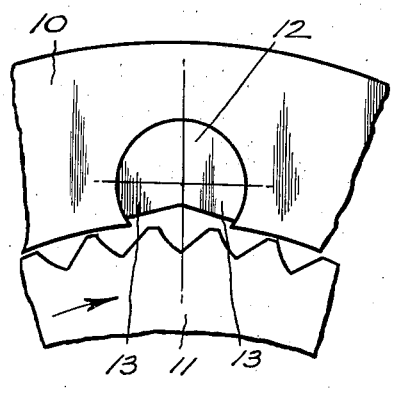
Figure 1 is a diagrammatic view showing a preferred form of detent and a fragment of a toothed wheel with which it is adapted to co-operate, the detent being shown in the neutral position.
Figure 2:
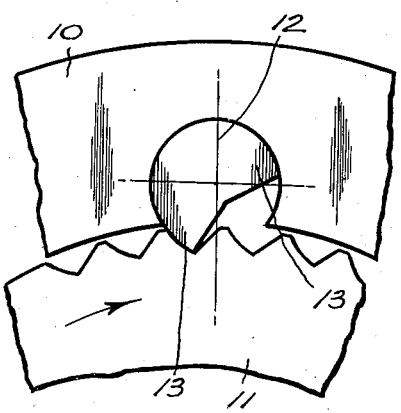
Figure 2 is a similar view showing the detent in the operative position.

In Figures 1 and 2, 10 is a stationary ring surrounding a toothed disc 11 adapted to be keyed on a shaft forming part of the transmission of a vehicle. A hardened steel detent 12 of part-cylindrical outline is rotatably mounted in a part-circular recess in the inner edge of the ring. The edge of the detent adjacent to the toothed disc is formed by two straight parts inclined at an obtuse angle to each other to provide at each end of this edge a blunt tooth 13 having one curved and one straight edge.

In the neutral position of the detent shown in Figure 1 the detent is clear of the teeth on the disc so that the shaft can rotate freely in either direction. To bring the detent into action it is partially rotated into the position shown in Figure 2 in which one end of the detent engages a tooth on the disc and positively prevents rotation of the disc and shaft in the direction indicated by the arrow.

The face of the tooth on the disc with which the detent engages is curved as shown to an arc about the effective centre of the detent so that any thrust on the detent caused by a force applied to the disc tending to rotate it in the direction of the arrow is substantially radial and by positive actuation of the detent it can be disengaged from the tooth even when supporting a load.

The detent is supported around the whole of the curved part of its periphery by the recess in the ring 10 so that it has ample strength and risk of failure is negligible.

Figure 3:
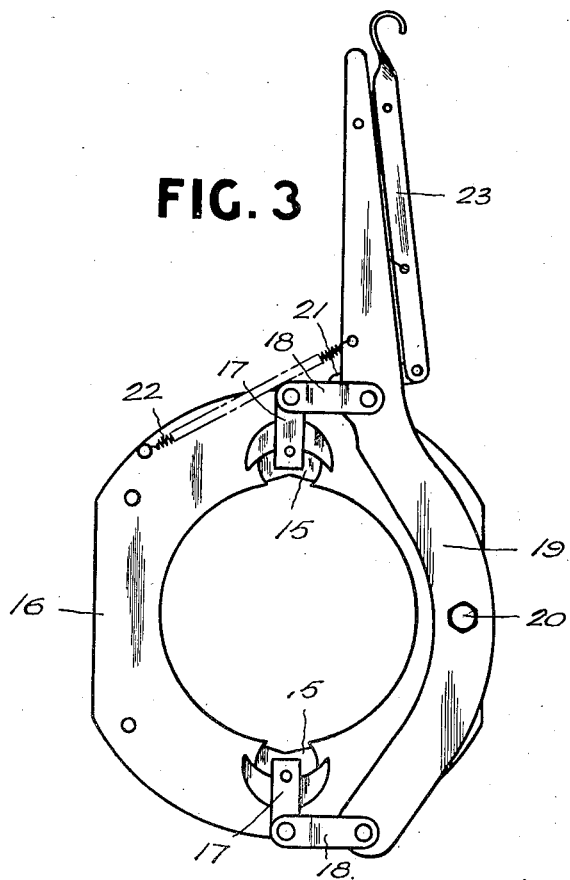
Figure 3 is an elevation of a unit embodying two hand-controlled detents for application to a rotating shaft on a vehicle.

Figure 3 shows two detents as described above coupled together and controlled by hand. The detents 15, 15 are rotatably mounted in opposed recesses in a ring 16 adapted to be secured to a convenient part of the vehicle chassis and to surround a toothed disc on a rotating shaft. Levers 17 secured to the detents are coupled by links 18 to a control lever 19 pivotally mounted at 20 on the ring. A pawl 21 pivotally mounted on the lever 19 engages a notch in the ring to hold the lever in the position shown against the action of a tension spring 22, the detents then being in the neutral position. To bring the detents into action the pawl is released by means of a trigger 23 and the spring rocks over the lever which in turn rocks over the detents into the operative position.

When the detents are in action and supporting the vehicle on a slope they can be disengaged at any time if necessary by actuating the lever 19 to return them to the neutral position.

For most purposes we prefer to arrange for the detents to be held normally in a neutral position by means actuated by the rotation of the shaft in the normal direction, the detents being brought into action automatically on any reverse rotation of the shaft.

Figure 4:
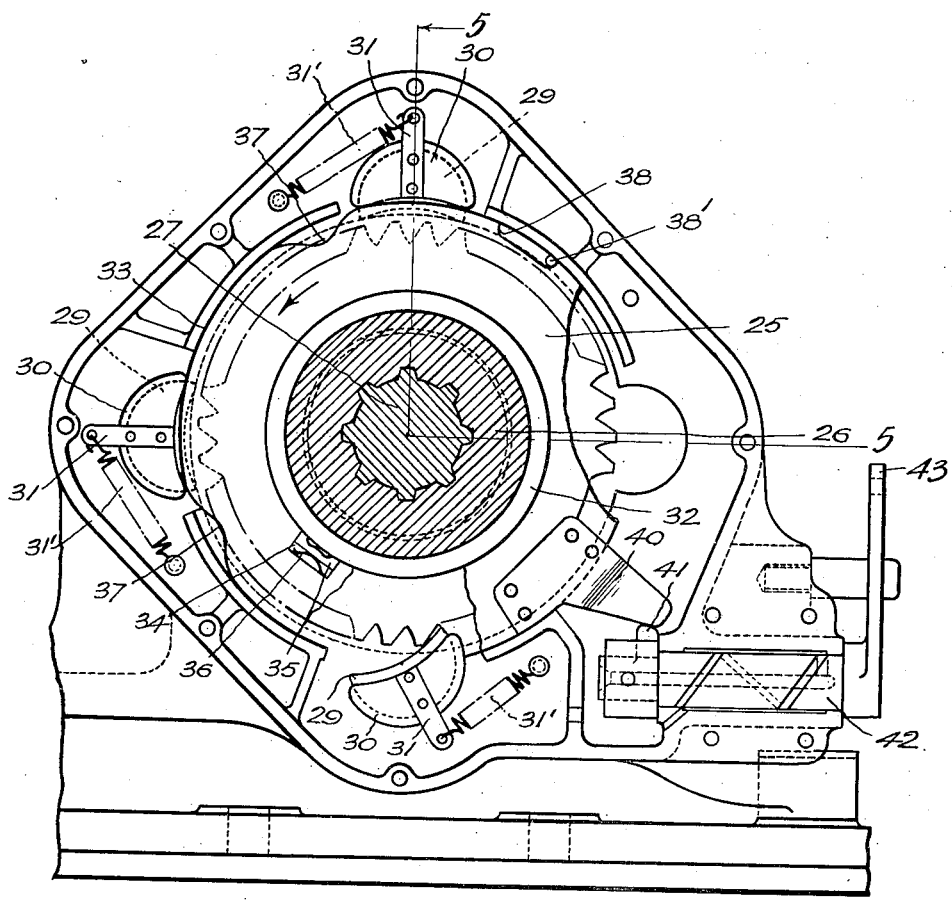
Figure 4 is an elevation in part section of a complete automatically controlled detent unit applied to the worm-shaft of a differential drive.
Figure 5:
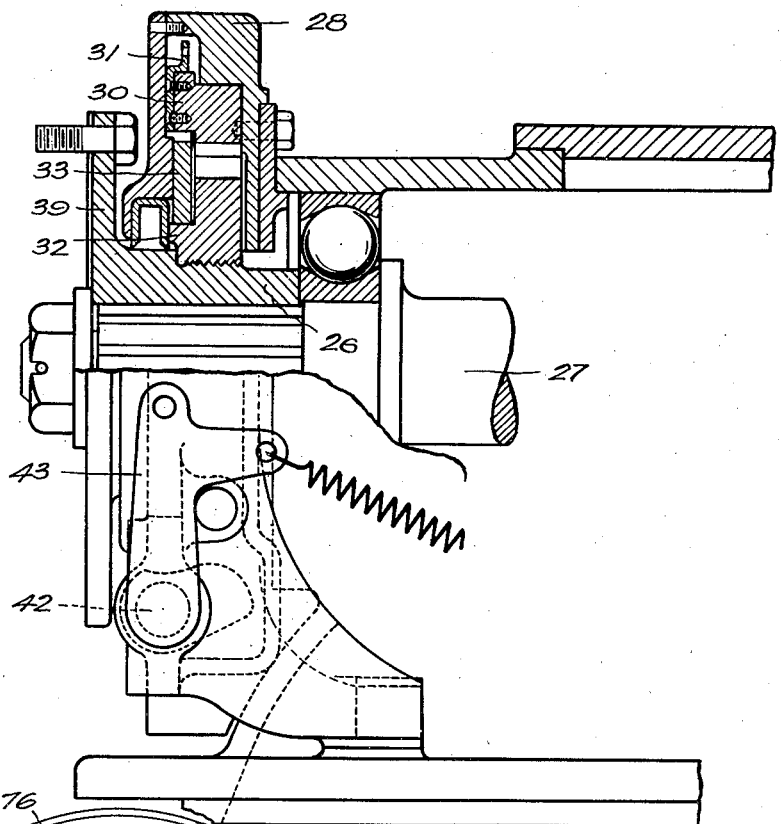
Figure 5 is a side elevation in part section along line 5—5 of the unit shown in Figure 4.

Such an arrangement is shown in Figures 4 and 5.

A toothed disc 25 is screwed or otherwise secured on a boss 26 splined on the rear end of the worm-shaft 27 of a rear axle drive. Surrounding the disc is a stationary casing 28 and in this housing are formed four equally spaced part-circular recesses in which are rotatably mounted four detents 29 adapted to co-operate with the teeth on the disc 25. A cam 30 having an outline similar to that of the detent but having rounded ends is secured to or made integral with the rear face of each detent to which is also secured a short radially extending lever 31. A tension spring 31' connected between the outer end of the lever 31 and an anchorage on the housing tends to rock the detent over into the operative position.

The disc 25 has a rearwardly extending boss 32 of a diameter less than that of the disc and having a plain peripheral surface. Fitting over this boss is a floating cam ring 33 which is just a clearance fit on the boss, and a recess 34 in the inner edge of the ring houses a hardened steel shoe 35 which is urged by a spring 36 into contact with the boss so that the ring is lightly coupled frictionally to the boss and tends to rotate with it.

The outer periphery of the ring has four equally spaced recesses 37 and in the normal position of the ring shown in Figure 4 these recesses lie in advance of the cams on the detents and the cams engage with the peripheral surface of the ring and hold the detents in the neutral position as shown at the top and left of the drawings. In this position of the ring one end of an arcuate recess 38 in the periphery of the ring engages a stationary stop peg 38' which is secured in the casing and projects into the recess, the length of which controls the angular movement permitted to the ring.

The rear end of the casing 28 is closed by a plate 39 which is provided at its inner edge with an oil seal so that the casing can be charged with oil if necessary.

In the normal direction of rotation of the shaft 27, which is indicated by the arrow in Figure 4, the cam ring 33, which tends to be carried round with the toothed disc owing to the frictional engagement of the shoe 35 with the boss 32, is held in the position shown by the engagement of one end of the recess 38 with the stop peg 38', and the peripheral surface of the ring engages with the cam 30 on each detent and holds the detents in the neutral position, so that the shaft 27 can rotate freely.

Immediately there is any reverse movement of the shaft 27 and disc 25 the cam ring is carried round until the other end of the recess 38 engages with the stop 38', and in this position of the ring the recesses 37 in the ring come into alignment with the forward ends of the cams 30 and the detents are then rocked over by their springs 31' into the locking position as shown at the bottom of Figure 4, the detents engaging with the teeth on the disc 25 and positively locking the disc and shaft against rotation in the reverse direction.

As soon as the shaft starts to rotate in the normal direction again the cam ring is carried round against its stop and restores the detents to their neutral position.

To allow the vehicle to be driven in reverse or moved about by hand in a garage any convenient means can be provided for holding the cam ring in the neutral position. In the arrangement shown in Figures 4 and 5 a radially projecting lug 40 is secured to the cam ring and is adapted to be engaged by a finger 41 on the inner end of a spindle 42 rotatably mounted in the casing. An arm 43 on the outer end of the spindle is adapted to be coupled in any convenient manner to the gear-selecting mechanism of the vehicle so that the spindle is rotated to hold the cam ring in the neutral position when reverse gear is engaged and release it as soon as a forward gear is engaged. The arm 43 may also be coupled to a hand lever to allow it to be operated manually.

Figure 6:
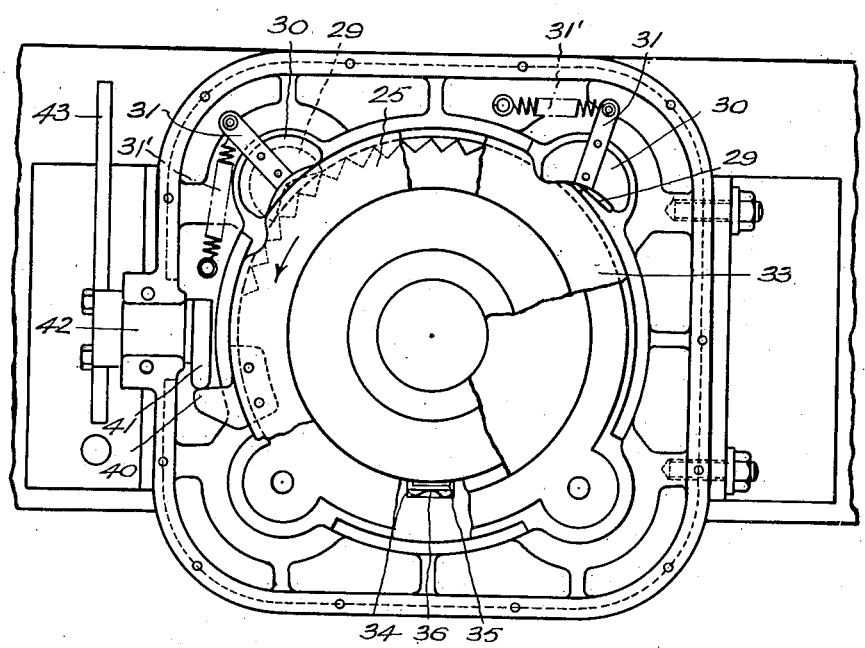
Figure 6 is an elevation of an automatically controlled unit applied to the Cardan shaft of a vehicle.
Figure 7:
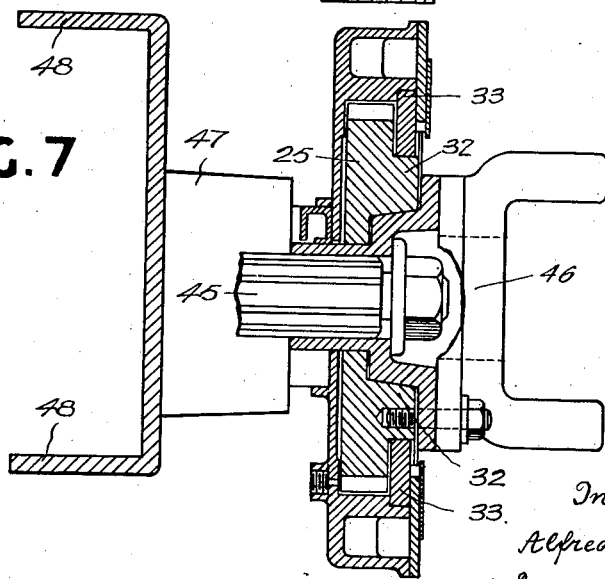
Figure 7 is a transverse section of the unit shown in Figure 6.

Figures 6 and 7 show detent mechanism substantially the same as the mechanism shown in Figures 4 and 5 and the same reference letters have been applied to corresponding parts so that there is no need to describe the mechanism itself in detail, but the mechanism is fitted in this case to the Cardan shaft 45 of a heavy vehicle between a universal joint, of which one member 46 is shown, and an intermediate bearing 47 in a crossmember 48 of the chassis.

In either of the mechanisms described above if it is desired to release the detents when they are in the operative position and holding the vehicle against reverse movement on a slope, for example, it is only necessary to actuate the lever 43 from the gear-selecting mechanism or hand control to return the cam ring and detents to the neutral position.

It will be understood that these two locations of the mechanism are shown by way of example only and that the mechanism can be fitted to any rotating part of the vehicle transmission wherever it is most convenient.

Figure 8:
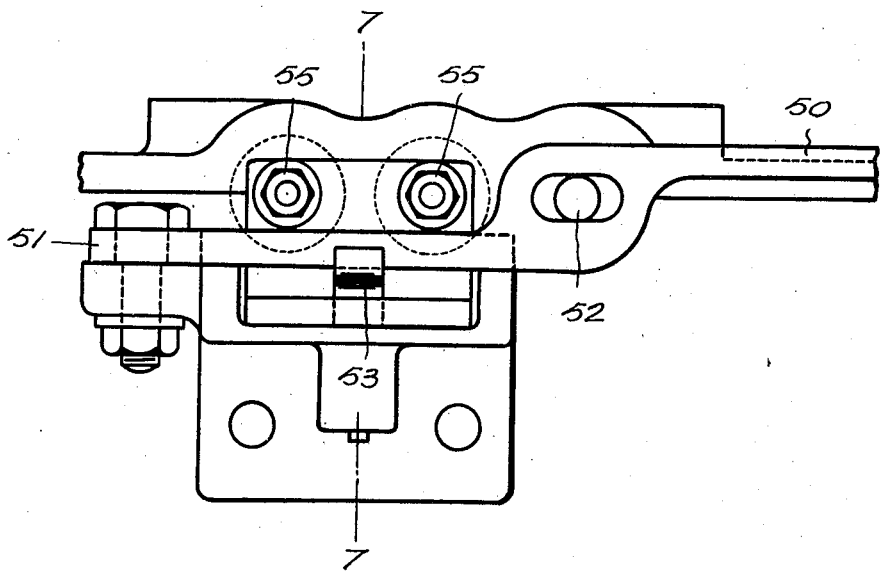
Figures 8 and 9 are a plan and section respectively of a control for the detents operated from gear-selecting mechanism.
Figure 9:
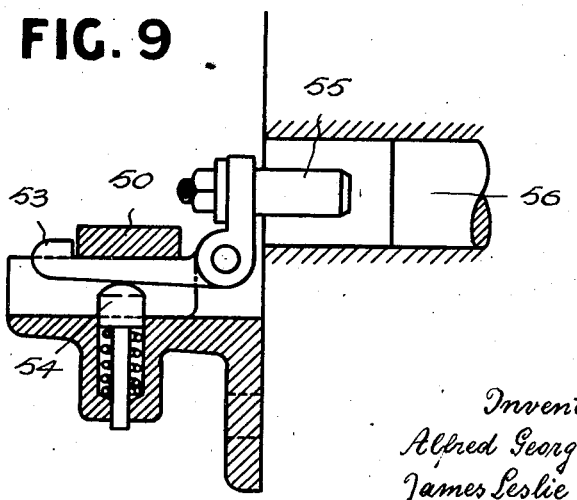

Figures 8 and 9 show one method of controlling the detent mechanism from the selector mechanism of a gear-box. In these figures 50 is a horizontal lever extending transversely across the rear end of the gear-box on which it is pivoted at one end at 51. The other end of the lever is connected by a cable to a member for holding the cam ring in the detent mechanism in the neutral position and is also connected to an emergency hand lever. An extension 52 of the selector rod for engaging reverse gear extends through a boss on the lever and has an abutment engaging the rear face of the boss so that when reverse gear is engaged the lever is rocked about its pivot to hold the detent mechanism in the neutral position. The lever is retained in this position by a pivoted latch 53, which is urged upwardly by a spring-loaded plunger 54, and carries studs 55 co-operating with the ends of the selector rods 56 for engaging the forward gears. Thus when the lever has been rocked over either by the engagement of reverse gear or by the actuation of the hand lever it remains in that position to hold the detents out of action until released by the engagement of a forward gear which depresses the latch 53 and allows the lever to return to its normal position.

Figures 10 and 11 show another form of control actuated from the gate of a change-speed mechanism. In these figures the reverse position for the gear lever in the gate is shown at R. The detent mechanism is controlled by a hand lever 60 pivoted about a horizontal pivot 61 and connected at its lower end by a cable 62 to the detent mechanism. The normal position of the part of the lever adjacent to the gate is shown at 60' in dotted lines, and the position the lever assumes when the detent mechanism is being held out of action is shown in full lines at 60''. The lever carries a horizontal peg 63 which projects across the slot in the gate in which the gear lever moves when engaging reverse gear and the lowest forward gear. To allow reverse gear to be engaged the lever 60 must first be moved manually into the position shown at 60'' so that the detent mechanism is put out of action before reverse gear is engaged, and the peg forms a stop preventing unintentional engagement of reverse gear when the vehicle is moving forwardly. Alternatively the gear lever as it is moved along the slot in the gate to the point marked R may carry the peg 63 with it to move the lever 60 into the position 60'' and so put the detent mechanism out of action. In the position 60'' the lever 60 engages with a notch 64 in one end of a spring-loaded latch member 65 which is pivoted to the side of the gate about a vertical axis 66.

The other end of the latch member terminates in a curved finger 67 which projects into the path of the gear lever as the lever is moved into the second-gear position. A stop for the latch member is formed by a cranked stud 68 adapted to engage a lug 69. Thus when reverse gear is engaged or the lever 60 is moved by hand into the position 60'' in which it holds the detent mechanism out of action the lever is retained in that position by the latch 65, but immediately the gear lever is moved into second-gear position it engages the finger 67 and rocks over the latch, and the lever 60 is released and returns to the position 60' so that the detent mechanism automatically comes into action again.

Figure 12:
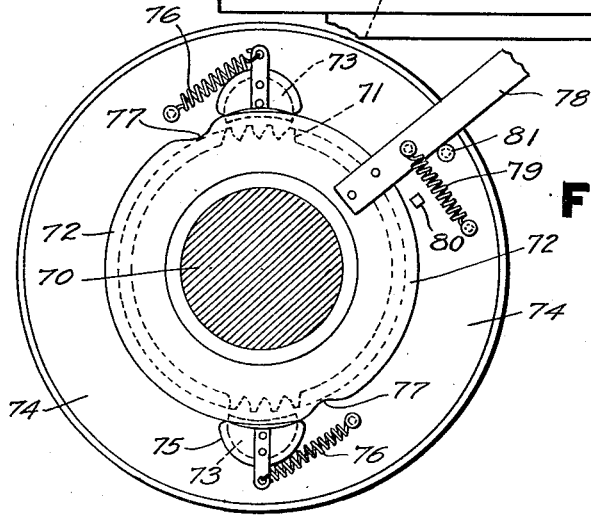
Fig. 12 is a diagrammatic elevation of a detent unit for use in a trailer vehicle.

It will be understood that these methods of controlling the detent mechanism from the gear-selecting mechanism and/or from a hand lever are given by way of example only and that various other methods may be employed for the same purpose.

Where the detent mechanism is applied to a trailer vehicle the detents may be controlled by an angularly movable ring which is urged by a spring into a position in which the detents are operative but is normally held in a position in which the detents are inoperative by a peg or other latch member connected by a light cable or other means to the tractor. Thus if the coupling between the tractor and trailer breaks the latch member is withdrawn and the detents come into action at once to prevent the trailer from running backwards. Such an arrangement is shown diagrammatically in Figure 12, where 70 is the trailer axle or a wheel hub, 71 is a toothed disc keyed on the shaft, and 72 is a cam ring angularly movable on the shaft. Detents 73 are rotatably mounted in part-circular recesses in a stationary casing 74 and integral with or secured to the detents are cams 75. A tension spring 76 connected between the outer end of an arm secured to the cam and an anchorage on the housing tends to rock the detent over into the operative position but it can only do so when the cam ring 72 is moved angularly in a clockwise direction to bring recesses 77 in the outer edge of the cam ring into alignment with the cams.

A radially extending arm 78 is secured to the cam ring and a tension spring 79 tends to move the ring in a clockwise direction into the position in which the detents are operative, this position being defined by a stop 80 for the arm 78. The cam ring is, however, normally held in the position shown in the drawing in which the detents are inoperative by a latch 81 connected by a light cable to the tractor so that if the coupling between the tractor and trailer breaks the latch 81 is withdrawn and the spring 79 moves the cam ring angularly in a clockwise direction until the arm 78 abuts against the stop 80 and the detents come into action to hold the trailer against reverse movement.

Alternatively or in addition a hand control may be provided for the latch member.

We claim:

1. Means for ensuring unidirectional rotation of a shaft comprising a disc rotating with the shaft, a stationary member surrounding said disc and having an annular inner edge concentric about said disc, part-circular recesses in the inner edge of the member, part-circular detents angularly movable in said recesses, and teeth on the periphery of the disc having faces curved to arcs about the effective centres of the detents with radii equal to those of the co-operating detent peripheries, a part of the circular surface of a detent engaging in one position of the detent with the curved face of a tooth on the disc so that by positive angular movement of the detent it can be disengaged from the tooth when under load.

2. Means for ensuring unidirectional rotation of a shaft comprising a disc rotating with the shaft, a stationary member surrounding said disc and having an annular inner edge concentric about said disc, part-circular recesses in the inner edge of the member, part-circular detents angularly movable in said recesses, teeth on the periphery of the disc having faces curved to arcs about the effective centres of the detents, cams associated with said detents, and a cam ring co-operating with said cams and angularly movable into a position in which it holds said detents clear of the disc and into another position in which it allows portions of the circular parts of the peripheries of the detents to engage with the faces of the teeth on the disc.

3. Means for ensuring unidirectional rotation of a shaft comprising a disc rotating with the shaft, a stationary member surrounding said disc and having an annular inner edge concentric about said disc, part-circular recesses in the inner edge of the member, part-circular detents angularly movable in said recesses, teeth on the periphery of the disc having faces curved to arcs about the effective centres of the detents, cams associated with said detents, a cam ring co-operating with said cams and angularly movable about the shaft, frictional means coupling the cam ring lightly to a part rotating with the shaft so that it tends to rotate with the shaft, and means limiting the angular movement of the ring in each direction, said cam ring in the angular position which it assumes when the shaft is rotating in the normal direction holding the detents clear of the disc and in the angular position it assumes when the shaft is rotating in the opposite direction allowing portions of the circular parts of the peripheries of the detents to engage with the curved faces of the teeth on the disc.

4. Means for ensuring unidirectional rotation of a shaft comprising a disc rotating with the shaft, a stationary member surrounding said disc and having an annular inner edge concentric about said disc, part-circular recesses in the inner edge of the member, part-circular detents angularly movable in said recesses, teeth on the periphery of the disc having faces curved to arcs about the effective centres of the detents, cams associated with said detents, an angularly movable cam ring co-operating with said cams and adapted in one angular position to hold the detents out of engagement with the disc and in another angular position allowing portions of the circular parts of the peripheries of the detents to engage with the curved faces of the teeth on the disc, spring means urging the cam ring into the latter position, and a releasable latch member holding the cam ring normally in the former position against the action of the spring means.

5. Means for ensuring unidirectional rotation of a shaft forming part of the transmission of a motor vehicle having selective gears comprising a disc rotating with the shaft, a stationary member surrounding said disc, part-circular recesses in the inner edge of said member, part-circular detents angularly movable in said recesses, teeth on the periphery of the disc having faces curved to arcs about the effective centres of the detents, said detents in one angular position being adapted to engage with said teeth faces, cams associated with said detents, an angularly movable cam ring co-operating with said cams to control the positions of the detents, and means actuated by the gear-selecting mechanism of the vehicle for moving the cam ring angularly to hold the detents in an inoperative position when reverse gear is engaged and for returning the ring to its normal position when a forward gear is engaged.

ALFRED GEORGE HACKETT.
JAMES LESLIE EDWARDS.